(12) United States Patent
Uchiyama

(10) Patent No.: US 9,969,109 B2
(45) Date of Patent: May 15, 2018

(54) INJECTION MOLDING SYSTEM

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 14/987,767

(22) Filed: Jan. 5, 2016

(65) Prior Publication Data
US 2016/0193761 A1 Jul. 7, 2016

(30) Foreign Application Priority Data

Jan. 7, 2015 (JP) .................................. 2015-001486

(51) Int. Cl.
*B29C 45/14* (2006.01)
*B29C 45/76* (2006.01)

(52) U.S. Cl.
CPC ...... *B29C 45/14008* (2013.01); *B29C 45/768* (2013.01); *B29C 2945/761* (2013.01); *B29C 2945/7613* (2013.01); *B29C 2945/76294* (2013.01); *B29C 2945/76357* (2013.01); *B29C 2945/76464* (2013.01)

(58) Field of Classification Search
CPC ............ B29C 45/14008; B29C 45/768; B29C 2945/761; B29C 2945/7613; B29C 2945/76294; B29C 2945/76357; B29C 2945/76464
See application file for complete search history.

(56) References Cited

U.S. PATENT DOCUMENTS

| 4,823,274 | A | 4/1989 | Kiya et al. | |
| 7,824,585 | B2 * | 11/2010 | Cheon | B29C 45/7653 |
| | | | | 264/272.17 |
| 8,070,993 | B2 * | 12/2011 | Keys | B29C 45/14073 |
| | | | | 264/40.4 |

(Continued)

FOREIGN PATENT DOCUMENTS

| CN | 102672881 A | 9/2012 |
| CN | 203752405 U | 8/2014 |

(Continued)

OTHER PUBLICATIONS

Office Action in JP Application No. 2015-001486, dated Sep. 13, 2016.

(Continued)

*Primary Examiner* — Robert B Davis
(74) *Attorney, Agent, or Firm* — Hauptman Ham, LLP

(57) ABSTRACT

An injection molding system is provided with inspection means for inspecting an insert part before a resin is injected into a mold, inspection data output means for outputting inspection data on the insert part obtained by the inspection means, and inspection data recording means for recording the inspection data on the insert part and physical quantities related to the injection of the resin into the mold in association with the cycle number of the molded article from the injection molding machine. Thus, the cause of bad molded articles, as well as that for a finished product, can be investigated in consideration of the inspection data on the insert part inserted into the mold.

8 Claims, 4 Drawing Sheets

(56) References Cited

U.S. PATENT DOCUMENTS

| | | | |
|---|---|---|---|
| 2002/0072134 A1* | 6/2002 | Ha | G01B 11/06 |
| | | | 438/14 |
| 2003/0090018 A1 | 5/2003 | Bulgrin | |
| 2006/0093692 A1* | 5/2006 | Miyajima | B29C 33/58 |
| | | | 425/129.1 |
| 2010/0244296 A1 | 9/2010 | Keys | |
| 2012/0135096 A1* | 5/2012 | Maeyama | B29C 31/008 |
| | | | 425/130 |

FOREIGN PATENT DOCUMENTS

| | | |
|---|---|---|
| CN | 203919542 U | 11/2014 |
| JP | 61-114832 A | 6/1986 |
| JP | 4-265719 A | 9/1992 |
| JP | 6-297499 A | 10/1994 |
| JP | 11-138583 A | 5/1999 |
| JP | 2000-52351 A | 2/2000 |
| JP | 2000-71303 A | 3/2000 |
| JP | 2001-154717 A | 6/2001 |
| JP | 2008-132726 A | 6/2008 |
| JP | 2008-284778 A | 11/2008 |
| JP | 2011-11426 A | 1/2011 |
| JP | 2013-86358 A | 5/2013 |
| JP | 2014-36042 A | 2/2014 |

OTHER PUBLICATIONS

Decision to Grant a Patent in JP Application No. 2015-001486, dated Nov. 8, 2016.
Office Action in CN Application No. 201610007227.8, dated Sep. 13, 2017, 12 pp.

* cited by examiner

FIG.3

```
ABC1234
20141225
```

FIG.4

| MOLDING CYCLE NUMBER | PHYSICAL QUANTITY #1 (PEAK PRESSURE) OF INJECTION MOLDING MACHINE | PHYSICAL QUANTITY #2 (MINIMUM CUSHION AMOUNT) OF INJECTION MOLDING MACHINE | PHYSICAL QUANTITY #3 OF INJECTION MOLDING MACHINE | PART INSPECTION DATA #1 (WEIGHT) | PART INSPECTION DATA #2 (SIZE) | PART INSPECTION DATA #3 (IMAGE) | PART INSPECTION DATA #4 (PRODUCTION INFORMATION) |
|---|---|---|---|---|---|---|---|
| 1 | M(1,1) | M(1,2) | M(1,3) | P(1,1) | P(1,2) | P(1,3) | P(1,4) |
| 2 | M(2,1) | M(2,2) | M(2,3) | P(2,1) | P(2,2) | P(2,3) | P(2,4) |
| : | | | | | | | |
| N−1 | M(N−1,1) | M(N−1,2) | M(N−1,3) | P(N−1,1) | P(N−1,2) | P(N−1,3) | P(N−1,4) |
| N | M(N,1) | M(N,2) | M(N,3) | P(N,1) | P(N,2) | P(N,3) | P(N,4) |

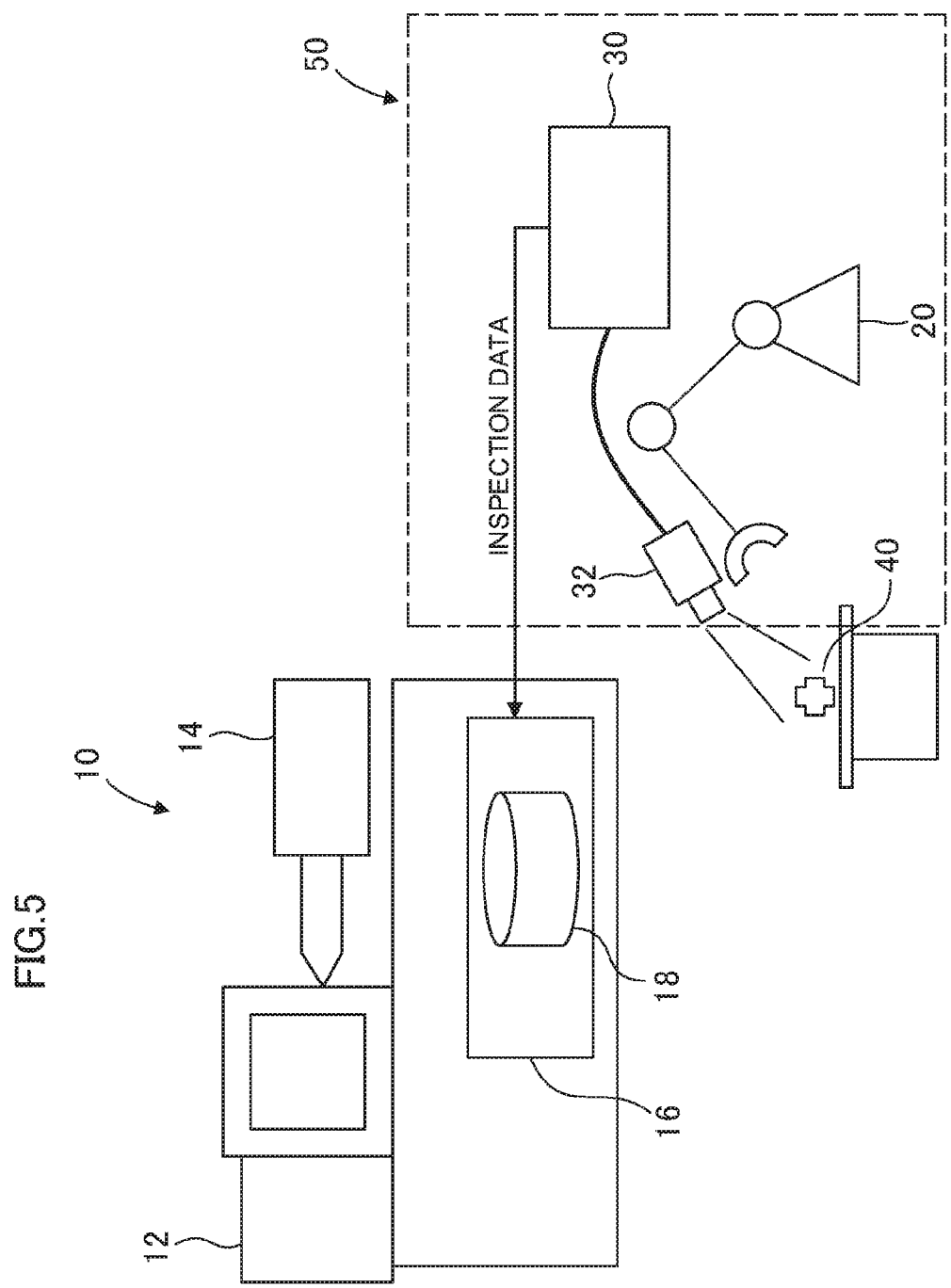

INJECTION MOLDING SYSTEM

RELATED APPLICATIONS

The present application claims priority to Japanese Application Number 2015-001486 filed Jan. 7, 2015, the disclosure of which is hereby incorporated by reference herein in its entirety.

BACKGROUND OF THE INVENTION

Field of the Invention

The present invention relates to an injection molding system. In particular, the present invention relates to a molding system in which an insert part is inserted into a mold of an injection molding machine to form a plastic molded article integral with the inserted insert part.

Description of the Related Art

There is a molding method in which an insert part is inserted into a mold of an injection molding machine, and a molten resin is injected into the inserted insert part to form a plastic molded article integral with the insert part. This is called insert molding and is performed to add value to the plastic molded article or achieve high functionality. In the plastic molding, a part of a metal or plastic material is used as the insert part to be inserted into the mold. A robot may be used to insert the insert part into the mold.

In some injection molding methods to control the quality of molded articles by determining the good/bad of the molded articles, the quality is determined by directly inspecting the molded articles. Alternatively, an injection molding machine for manufacturing molded articles may be configured to indirectly determine the quality by detecting the maximum value (peak pressure) of a resin pressure detected during a molding process or physical quantities, such as the screw's most advanced position (minimum cushion amount), speed, temperatures, and the like during the molding process. In some cases, moreover, the good/bad of molded articles may be determined by detecting physical quantities such as the weights and sizes of molded articles that are finished after completion of the molding process.

In an existing method for directly inspecting molded articles, the external appearances of the molded articles are inspected by human eyes or a sensor or the like. In a conventional method for detecting physical quantities, it is determined whether or not physical quantities such as a pressure, position, speed, and temperature are within their tolerances. Poor appearances of the molded articles include discoloration and burning of the molded articles, silver streaks, voids, weld lines, flow marks, bubbles, jetting, contamination, and the like. Although any of these methods are available, the method for directly inspecting molded articles generally requires much labor and cost for the inspection. Therefore, the indirect inspection based on physical quantities is performed in many cases.

Japanese Patent Application Laid-Open No. 2000-71303 discloses a technique in which the good/bad of a molded article is determined by measuring physical quantities during injection molding in plastic molding such that an insert part is inserted into a mold and a molten resin is injected into the inserted insert part to form the molded article.

Japanese Patent Application Laid-Open No. 2001-154717 discloses a technique in which a robot is mounted on an injection molding machine and used to insert an insert part into a mold of the injection molding machine.

Japanese Patent Application Laid-Open No. 61-114832 discloses a technique in which various variables, such as the cycle time, injection time, kneading time, peak injection pressure, switching pressure, and cushion amount, are detected and recorded in a molding cycle of an injection molding machine.

Japanese Patent Application Laid-Open No. 2013-86358 discloses a technique in which physical quantities that are considerably related to poor appearance are detected and displayed on a display device of an injection molding machine.

The so-called insert molding is disclosed in Japanese Patent Applications Laid-Open No. 2000-71303 and No. 2001-154717. Japanese Patent Application Laid-Open No. 2000-71303 also discloses how to detect the physical quantities during the injection molding for the determination of the good/bad. Further, Japanese Patent Applications Laid-Open No. 61-114832 and 2013-86358 disclose techniques in which the good/bad is determined by detecting the physical quantities during the molding process and physical quantities such as the weights and sizes of finished molded articles, in conventional injection molding, not insert molding. In any of these techniques, however, the good/bad is determined by using only the physical quantities related to finished molded articles and the physical quantities during the molding process, so that the cause of bad molded articles, including that of the insert part, may not be able to be investigated.

SUMMARY OF THE INVENTION

Accordingly, the object of the present invention is to provide an injection molding system for insert molding, capable of investigating the cause of bad molded articles based on data on an insert part associated with physical quantities for an injection molding process.

An injection molding system according to the present invention comprises an injection molding machine configured to form an integrated molded article from an insert part inserted into a mold and a resin injected into the mold, part insertion means for inserting the insert part into the mold, inspection means for inspecting the insert part before the resin is injected into the mold, inspection data output means for outputting inspection data on the insert part obtained by the inspection means, and inspection data recording means for recording the inspection data on the insert part and physical quantities related to the injection of the resin into the mold in association with the cycle number of the molded article from the injection molding machine.

Thus, the inspection data on the insert part and the physical quantities related to the injection of the resin into the mold are recorded in association with the cycle number of the molded article from the injection molding machine. If the integrated molded article formed of the insert part inserted into the mold and the resin injected into the mold is found to be bad molded articles, the cause of bad molded articles, as well as that for a finished product, can be investigated in consideration of the inspection data on the insert part inserted into the mold.

The part insertion means may be a robot. Thus, the dependence of injection operation on human labor can be reduced.

The inspection means may be attached to the part insertion means. Thus, the insert part can be smoothly inserted into the mold after completion of inspection.

The inspection means may comprise weight measuring means for measuring the weight of the insert part, and the inspection data output means may output the weight measured by the weight measuring means.

The inspection means may comprise size measuring means for measuring the size of at least a portion of the insert part, and the inspection data output means may output the size measured by the size measuring means.

The inspection means may comprise image acquisition means for acquiring an image of at least a portion of the insert part, and the inspection data output means may output the acquired image.

The inspection means may comprise production information acquisition means for acquiring an image of production information on a surface of the insert part and information reading means for reading a numerical value or character information from the image of the production information acquired by the production information acquisition means, and the inspection data output means may output the read numerical value or character information.

According to the present invention, there can be provided an injection molding system for insert molding, capable of investigating the cause of bad molded articles based on data on an insert part associated with physical quantities for an injection molding process.

BRIEF DESCRIPTION OF THE DRAWINGS

The above and other objects and features of the present invention will be obvious from the ensuing description of embodiments with reference to the accompanying drawings, in which:

FIG. 3 is a schematic diagram showing how production information is captured by a camera in the embodiment of the invention;

FIG. 4 is a diagram showing data stored in storage means in the embodiment of the invention; and FIG. 5 is a schematic diagram for illustrating a modification of the invention.

DETAILED DESCRIPTION OF THE PREFERRED EMBODIMENTS

Figure 1:
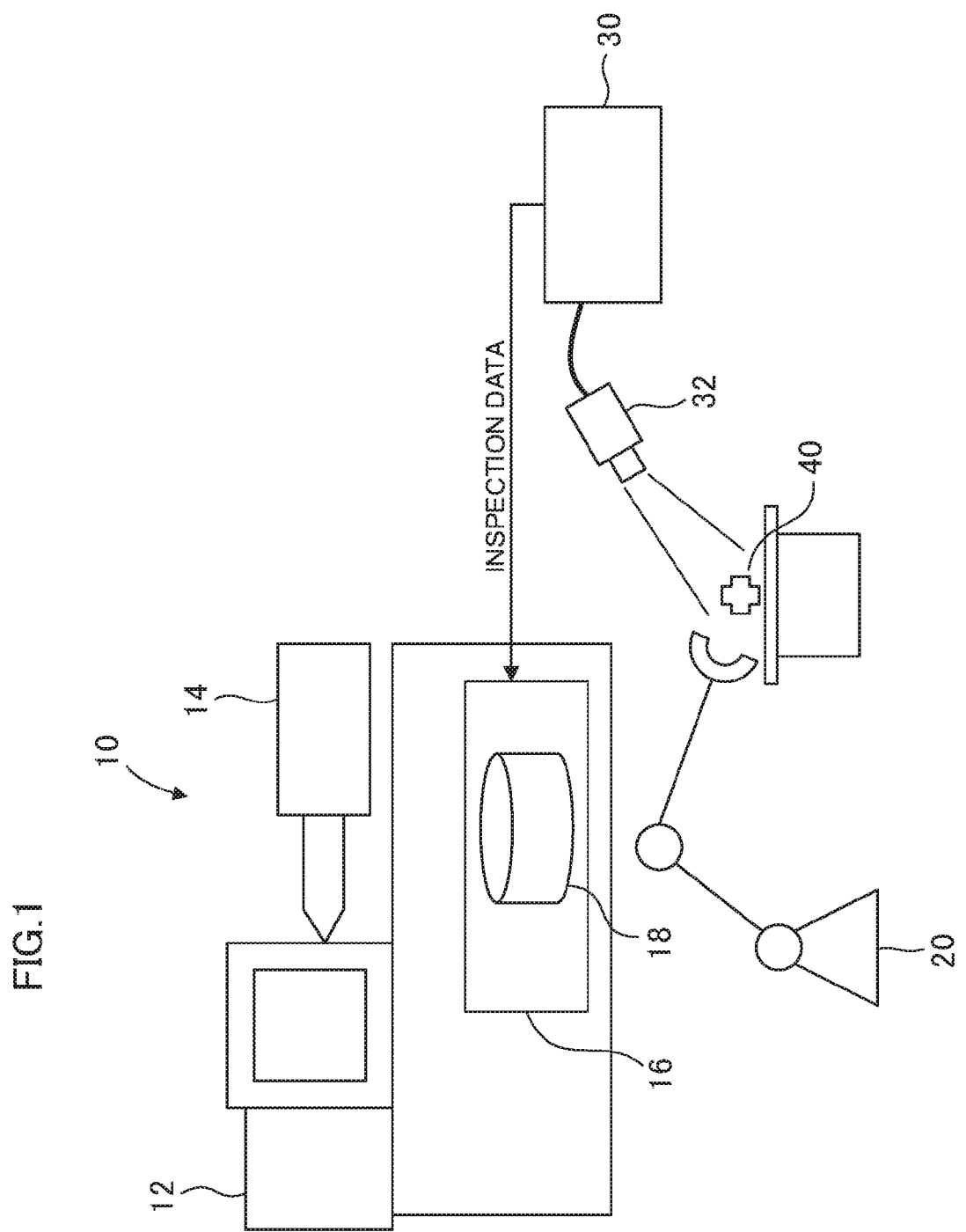
FIG. 1 is a schematic diagram for illustrating an embodiment of the present invention.

FIG. 1 is a schematic diagram for illustrating an embodiment of the present invention. An injection molding machine 10 mainly comprises a mold clamping device 12 and an injection device 14. The mold clamping device 12 is provided with a mold (not shown). A resin is injected from the injection device 14 into the mold, and a molded article is molded by mold closing and clamping operations thereafter. Further, a controller 16 for generally controlling the injection molding machine 10 is disposed in the machine 10. The controller 16 controls the injection molding machine based on a set value input from input means (not shown) and a predetermined control program. Further, the injection molding machine 10 is provided with various sensors (not shown). The sensors include a temperature sensor, pressure sensor, position/speed sensor, and the like. The temperature sensor detects the temperatures of the mold and an injection cylinder. The pressure sensor detects pressures in the mold and the injection cylinder. The position/speed sensor detects the rotational position and speed of an injection screw in the injection cylinder and the axial movement position and speed. Various physical quantities in the injection molding machine 10 are detected by these sensors. The physical quantities detected by the sensors are stored in storage means 18 in association with molding cycles.

In the injection molding machine 10 of the present embodiment, the resin is injected into the mold after a part is inserted into the mold. By doing this, the inserted part and the resin injected into the mold are joined together to form a molded article. This molding method is the so-called insert molding.

In the insert molding, a part 40 is inserted into the mold by part insertion means 20. A conventional working robot can be used for the part insertion means 20. Component inspection means 30 and a camera 32 are connected to each other. An image of the whole or a portion of the part 40 captured by the camera 32 is delivered to the part inspection means 30. Further, the image of the part 40 delivered to the part inspection means 30 is sent as inspection data to the controller 16 of the injection molding machine 10. The part inspection means 30 and the injection molding machine 10 are connected by communication means, and the inspection data is delivered to the controller 16 of the injection molding machine 10 through the communication means.

The image captured by the camera 32 and delivered to the part inspection means 30 is processed by the part inspection means 30 and the size of the whole or a portion of the molded article is measured. The measured size can be delivered to the controller 16 of the injection molding machine 10. The size may be directly obtained by using electronic vernier calipers (not shown) without the processing of the image captured by the camera 32 so that the obtained size can be delivered to the controller 16.

Figure 2:
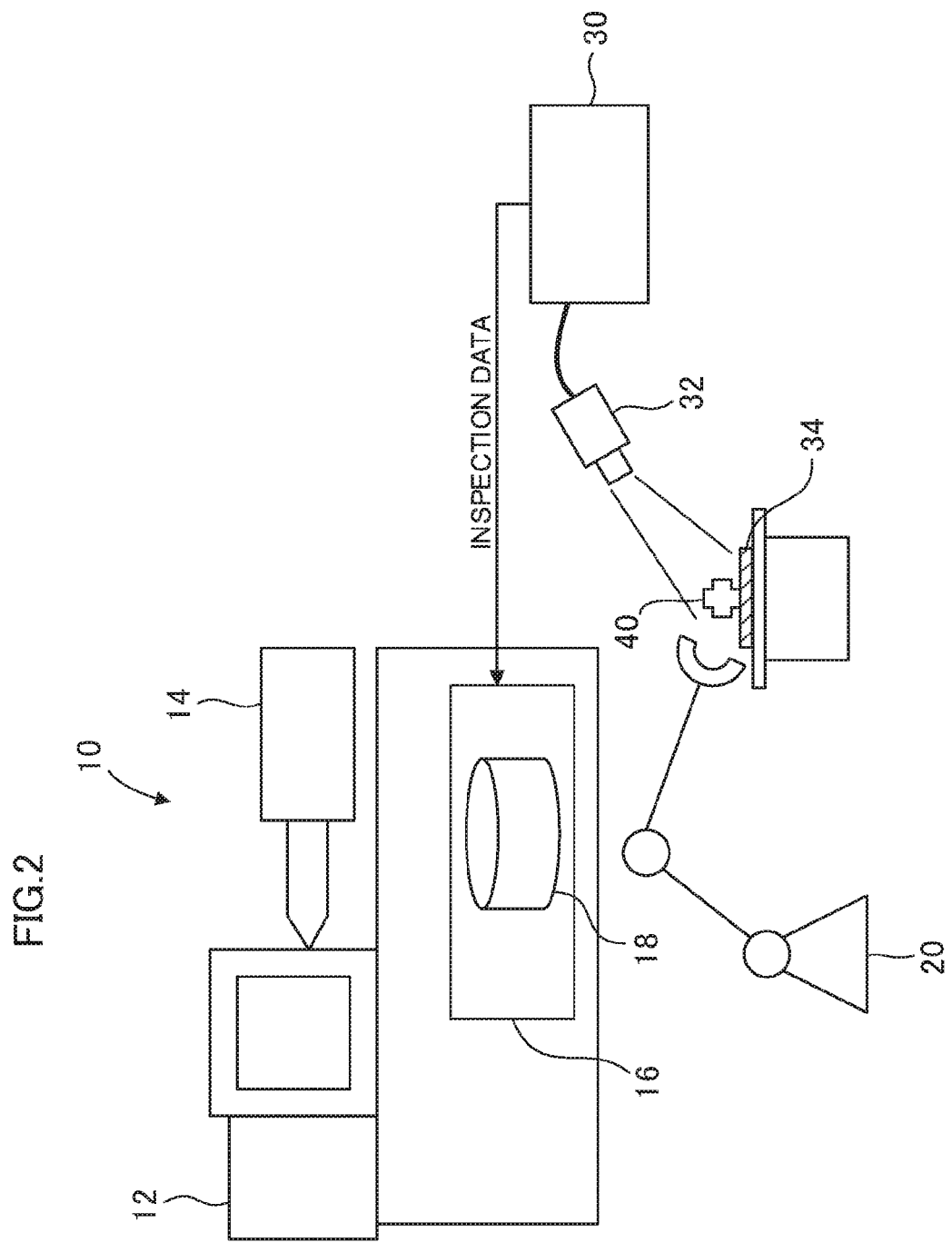
FIG. 2 is a schematic diagram for illustrating an example of the embodiment of the invention.

As shown in FIG. 2, a weight scale 34 is disposed on a table on which the part 40 is placed and used to measure the weight of the part 40. The measured weight can be delivered to the part inspection means 30 and then to the controller 16 of the injection molding machine 10.

The physical quantities of the part 40 inserted into the mold in the insert molding are not limited to specific ones such as the size and weight and may alternatively be any other quantities that influence the quality of the integrated molded article. If the temperature of the part 40 influences shape defects, such as warp and size defect, of the integrated molded article, for example, a thermometer for measuring the temperature of the part 40 may be provided in place of the weight scale 34. The temperature measured by the thermometer may be delivered to the part inspection means 30 so that it can be delivered from the part inspection means 30 to the controller 16 of the injection molding machine 10.

As shown in FIG. 3, an image of production information, including a lot number and a production date, inscribed on the surface of the part 40 may be captured by the camera 32. The captured image may be read by using an image processor in the part inspection means 30 so that read numerical values and character information can be delivered to the controller 16 of the injection molding machine 10.

The inspection data on the part 40 delivered from the part inspection means 30 to the controller 16 of the injection molding machine 10 is stored in a table form in the storage means 18 of the controller 16, as shown in FIG. 4. The leftmost column indicates molding cycle numbers, for which physical quantities related to the injection of the resin in the injection molding machine and part inspection data are stored correspondingly. As described before, the physical quantities related to the injection of the resin in the injection molding machine include various physical quantities detected by the sensors (not shown) attached to the injection molding machine. According to the present embodiment, an example is given in which a peak pressure value and the value of a minimum cushion amount are stored as Physical quantities 1 and 2, respectively.

The physical quantities related to the injection of the resin in the injection molding machine are not limited to those quantities, such as the peak pressure and the minimum cushion amount, which are measured in an injection process only. An injection process in a broad sense is defined as a process (including a dwelling process) for filling the resin into the mold, and the physical quantities further include a resin pressure, screw position, screw speed, injection time, metering time, and the like, during the injection process. Furthermore, the physical quantities include a resin pressure, screw position, screw speed, screw rotation speed, screw rotation torque, metering time, and the like, in a metering process for metering a predetermined resin in a preparation stage for injection, or a mold temperature, nozzle temperature, cylinder temperature, and the like, related to the molten state of the resin during the injection.

The weight, size, and image of the part and the production information, including the lot number, production date, and the like, are stored as the part inspection data. Although the weight, size, image, and production information are all stored in the present embodiment, only one of these data may be expected to be stored.

In the injection molding machine 10, the image captured by an image inspection device (not shown) is analyzed, and the good/bad of molded articles is determined for each molding cycle by human visual recognition. If any bad article is generated, the physical quantities in the injection molding machine and inspection data on the inserted part in case of the generation of the bad article can be obtained based on the data stored in the storage means shown in FIG. 4. By comparison with the physical quantities in the injection molding machine and the inspection data on the inserted part for a good molded article, the cause of bad molded articles, as well as that for a finished product, can be investigated in consideration of the physical quantities and the inspection data. Production information for the part inspection data can be checked by following up quality information obtained when the part is inserted and molded, based on the production information including the lot number, production date, and the like.

FIG. 5 is a diagram showing a modification of the present embodiment. This modification differs from the foregoing embodiment in that the part inspection means 30 and the part insertion means 20 are integral with each other. Accordingly, as a method of part inspection, the robot for use as the part insertion means 20 is configured to measure a load generated in a motor for driving the robot when the part 40 is held so that the weight of the part 40 can also be measured based on the measured load. Alternatively, moreover, the image of the part 40 can be captured by the camera 32 attached to the robot, the size of the whole or a portion of the part 40 can be measured from the captured image, or the production information inscribed on the surface of the part 40 can be read.

The invention claimed is:

1. An injection molding system, comprising:
an injection molding machine configured to form an integrated molded article from an insert part inserted into a mold and a resin injected into the mold;
part insertion means for inserting the insert part into the mold;
inspection means for inspecting the insert part before the resin is injected into the mold, and outputting inspection data on the insert part obtained by the inspection; and
a controller configured to control the injection molding machine, and record
the inspection data on the insert part and
physical quantities related to the injection of the resin into the mold
in association with the cycle number of the molded article from the injection molding machine.

2. The injection molding system according to claim 1, wherein the part insertion means is a robot.

3. The injection molding system according to claim 1, wherein the inspection means is attached to the part insertion means.

4. The injection molding system according to claim 1, wherein the inspection means comprises weight measuring means for measuring the weight of the insert part, and outputs the weight measured by the weight measuring means as the inspection data on the insert part.

5. The injection molding system according to claim 1, wherein the inspection means comprises size measuring means for measuring the size of at least a portion of the insert part, and outputs the size measured by the size measuring means as the inspection data on the insert part.

6. The injection molding system according to claim 1, wherein the inspection means comprises image acquisition means for acquiring an image of at least a portion of the insert part, and outputs the acquired image as the inspection data on the insert part.

7. The injection molding system according to claim 1, wherein the inspection means
comprises production information acquisition means for acquiring an image of production information on a surface of the insert part,
reads a numerical value or character information from the image of the production information acquired by the production information acquisition means, and
outputs the read numerical value or character information as the inspection data on the insert part.

8. The injection molding system according to claim 1, wherein when a specific molded article is generated, the inspection data recorded in the controller is obtained to investigate a cause for the specific molded article, by comparing physical quantities in the injection molding machine and the recorded inspection data.

* * * * *